(12) United States Patent
Masala et al.

(10) Patent No.: US 12,105,737 B2
(45) Date of Patent: Oct. 1, 2024

(54) STATISTICS-BASED DYNAMIC DATABASE PARTITIONS

(71) Applicant: AMADEUS S.A.S., Biot (FR)

(72) Inventors: Daniele Masala, Villeneuve-Loubet (FR); Lionel Gotti, Antibes (FR); Matteo Casalino, Antibes (FR); Nicolas Vizern, Nice (FR); Giacomo Margaria, Villeneuve-Loubet (FR); Huseyin Kilic, Nice (FR)

(73) Assignee: AMADEUS S.A.S., SOPHIA ANTIPOLIS, Biot (FR)

( * ) Notice: Subject to any disclaimer, the term of this patent is extended or adjusted under 35 U.S.C. 154(b) by 0 days.

(21) Appl. No.: 17/857,763

(22) Filed: Jul. 5, 2022

(65) Prior Publication Data

US 2023/0041308 A1    Feb. 9, 2023

(30) Foreign Application Priority Data

Aug. 3, 2021 (EP) .................................... 21306083

(51) Int. Cl.
| | |
|---|---|
| *G06F 16/00* | (2019.01) |
| *G06F 16/23* | (2019.01) |
| *G06F 16/2458* | (2019.01) |
| *G06F 16/27* | (2019.01) |
| *G06F 16/28* | (2019.01) |

(52) U.S. Cl.
CPC ........ *G06F 16/278* (2019.01); *G06F 16/2379* (2019.01); *G06F 16/2462* (2019.01); *G06F 16/285* (2019.01)

(58) Field of Classification Search
None
See application file for complete search history.

(56) References Cited

U.S. PATENT DOCUMENTS

| | | |
|---|---|---|
| 6,405,284 B1 | 6/2002 | Bridge |
| 11,308,066 B1* | 4/2022 | Li .......... G06F 16/278 |
| 2015/0235038 A1* | 8/2015 | Inoue .......... G06F 16/278 707/737 |
| 2016/0055192 A1* | 2/2016 | Bensberg .......... G06F 16/2282 707/755 |

* cited by examiner

*Primary Examiner* — Anhtai V Tran
(74) *Attorney, Agent, or Firm* — PERRY + CURRIER, INC.

(57) ABSTRACT

The present disclosure relates to database technology and in particular to dynamically updating and customizing database partitions. A computer-implemented engine is disclosed for identifying and retrieving a number of data records applicable to generate a response to a request, the engine having access to at least two partitions. Partition statistics are generated indicating correlations between the data records and, based on that partition statistics, the data records having the strongest correlation with each other are relocated to partitions so that the number of partitions which have to be queried in order to generate a response to a data request is minimized. Furthermore, the computational load caused when generating responses is more equally distributed across the partitions.

13 Claims, 13 Drawing Sheets

| ID | Content A | Content B | Content C | (Stored in partiton) |
|---|---|---|---|---|
| 0000 | A1 | B1 | C1 | (10-1) |
| 0001 | A2 | B2 | C2 | (10-1) |
| 0002 | A3 | B3 | C3 | (10-1) |
| 0010 | A4 | B4 | C4 | (10-2) |
| 0011 | A5 | B5 | C5 | (10-2) |
| 0012 | A6 | B6 | C6 | (10-2) |
| 0013 | A7 | B7 | C7 | (10-2) |
| 0014 | A8 | B8 | C8 | (10-2) |

FIG. 3

| ID (or clusters of IDs) | # of requests in arb. time unit |
|---|---|
| 0000 | 1 000 000 |
| 0001 | 900 000 |
| (0000, 0014) | 750 000 |
| 0002 | 700 000 |
| (0000, 0001) | 600 000 |
| 0010 | 92 000 |
| 0013 | 90 000 |
| 0012 | 83 000 |
| 0014 | 80 000 |
| 0011, (0010, 0012) | 70 000 |
| (0010, 0011) | 60 000 |
| (0011, 0012) | 50 000 |
| (0000, 0002) | 30 000 |
| (0002, 0013) | 25 000 |

| ID (or clusters of IDs) | # of requests in arb. time unit |
|---|---|
| 0000 | 1 000 000 |
| 0001 | 900 000 |
| (0000, 0014) | 750 001 |
| 0002 | 700 000 |
| (0000, 0001) | 600 000 |
| 0010 | 92 000 |
| 0013 | 90 000 |
| 0012 | 83 000 |
| 0014 | 80 000 |
| 0011, (0010, 0012) | 70 000 |
| (0010, 0011) | 60 000 |
| (0011, 0012) | 50 000 |
| (0000, 0002) | 30 000 |
| (0002, 0013) | 25 000 |

FIG. 7

|      | 0000   | 0001 | 0002  | 0010  | 0011  | 0012 | 0013 | 0014 | 0020 | 0021 | 0022 |
|------|--------|------|-------|-------|-------|------|------|------|------|------|------|
| 0000 |        |      |       |       |       |      |      |      |      |      |      |
| 0001 | 600000 |      |       |       |       |      |      |      |      |      |      |
| 0002 | 30000  |      |       |       |       |      |      |      |      |      |      |
| 0010 |        |      |       |       |       |      |      |      |      |      |      |
| 0011 |        |      |       | 60000 |       |      |      |      |      |      |      |
| 0012 |        |      | 25000 | 70000 | 50000 |      |      |      |      |      |      |
| 0013 |        |      |       |       |       |      |      |      |      |      |      |
| 0014 | 700001 |      |       |       |       |      |      |      |      |      |      |
| 0020 |        |      |       |       |       |      |      |      |      |      |      |
| 0021 |        |      |       |       |       |      |      |      |      |      |      |
| 0022 |        |      |       |       |       |      |      |      |      |      |      |

FIG. 8

| data record # | ID | Content A | Content B | Content C |
|---|---|---|---|---|
| data record 1 | 0000 | A1 | B1 | C1 |
| data record 2 | 0001 | A2 | B2 | C2 |
| data record 3 | 0002 | A3 | B3 | C3 |
| data record 4 | 0010 | A4 | B4 | C4 |
| data record 5 | 0011 | A5 | B5 | C5 |
| data record 6 | 0012 | A6 | B6 | C6 |
| data record 7 | 0013 | A7 | B7 | C7 |
| data record 8 | 0014 | A8 | B8 | C8 |
| data record 9 | 0020 | A9 | B9 | C9 |
| data record 10 | 0021 | A10 | B10 | C10 |
| data record 11 | 0022 | A11 | B11 | C11 |

FIG. 9

| ID (or clusters of IDs) | # of requests in arb. time unit |
|---|---|
| 0000 | 1 000 000 |
| 0001 | 900 000 |
| (0000, 0014) | 750 001 |
| 0002, *(0000, 0022)* | 700 000 |
| (0000, 0001) | 600 000 |
| 0010 | 92 000 |
| 0013 | 90 000 |
| 0012 | 83 000 |
| 0014 | 80 000 |
| 0011, (0010, 0012), *(0010, 0020)* | 70 000 |
| (0010, 0011) | 60 000 |
| (0011, 0012) | 50 000 |
| (0000, 0002) | 30 000 |
| (0002, 0013) | 25 000 |
| *0021* | *600* |

STATISTICS-BASED DYNAMIC DATABASE PARTITIONS

FIELD

The present disclosure generally relates to database technology and in particular to dynamically updating and customizing database partitions.

BACKGROUND

The growing amounts of data which has to be processed by databases such as by generation of responses to data requests has increased the number of evaluations the databases have to perform, increasing the computational load the databases have to shoulder. In addition, the time needed to compute a response for a requesting client is increasing, leading to longer times clients have to wait for the reception of their responses.

U.S. Pat. No. 9,317,577 B2 describes a system and method for dynamically partitioning a database, and specifically relates to a concept of dynamically updating and customizing the database partitions. A query execution is followed by providing a feedback which determines the frequently queried data items. The feedback also comprises statistics of which data items are hit for each data query and queried times of each partition. Further, the data partition rules are updated based on data query frequency in the database. Most frequently information is grouped and re-allocated in one database partition according to the new data partition rules. Further, while handling a user query, the user query is parsed and it is determined whether the query may be finished by searching at least one partition instead of all partitions. If the data query request matches at least one partition, then the search is conducted within certain matching partitions.

U.S. Pat. No. 8,972,403 B2 describes a system and method for partitioning data records into different physical partitions such that allowing the efficiently storing the data records, as well as, improving the hit rate of the buffer pool, without affecting a clustering property of the data records. The method creates index for a plurality of data records where each index includes a counter. The method then updates the numerical value of the counter for the data records subjected to random access. The data records that are frequently subjected to random access are stored in the same or successive data pages, such that the hit rate of the buffer pool may be effectively improved when they are loaded into the buffer pool together. The method reorganizes a plurality of data records based upon numerical values of a plurality of counters. Thus, the data records subjected to more frequent random access are stored in the frequently used partitions.

There is a general demand for systems which render database request processing still more efficient.

SUMMARY

In this context, a computer-implemented engine is defined for identifying and retrieving a number of data records applicable to generate a response to a request, the engine having access to at least two partitions, a first partition and a second partition, each of the partitions maintaining a plurality of the data records. The engine is arranged to generate partition statistics during a number of identification and retrieval procedures, the partition statistics indicating correlations between the data records. The engine is further arranged to update the partitions based on the partition statistics, including relocating a first data record from the first partition to the second partition in response to determining, based on the partition statistics, that the second partition includes a second data record with a higher correlation to the first data record than further data records in the first partition. The engine is further arranged to determine a number of data records to generate the response to the request based on the updated partitions, including identifying the first data record and the second data record to be applicable to generate the response, and retrieving the first data record and the second data record from the second partition.

In addition, a corresponding method and a corresponding computer program stored on a computer-readable medium executing the method on a computer are provided.

Further refinements are set forth by the dependent claims.

Further aspects are apparent from the subsequent description.

BRIEF DESCRIPTION OF THE FIGURES

Aspects and examples of the present disclosure are described with reference to the following figures, in which.

DETAILED DESCRIPTION

The present disclosure relates to database technology and in particular to dynamically updating and customizing database partitions. The ever-increasing amount of data which has to be processed e.g. by generating responses to data request by databases is leading to a considerable increase of the computational load on computing systems. Furthermore, the time needed to compute a response for a requesting client is increasing, leading to longer times clients have to wait for the reception of their responses.

The present disclosure addresses the aforementioned aspects by distributing the amount of data disjunctly on different partitions of a computing environment, such as a database system. Since each partition stores a part of the whole data, a smaller amount of data has to be processed for a specific data request, and the response is computed by one or a small number of partitions, but not by the whole database.

Figure 1:
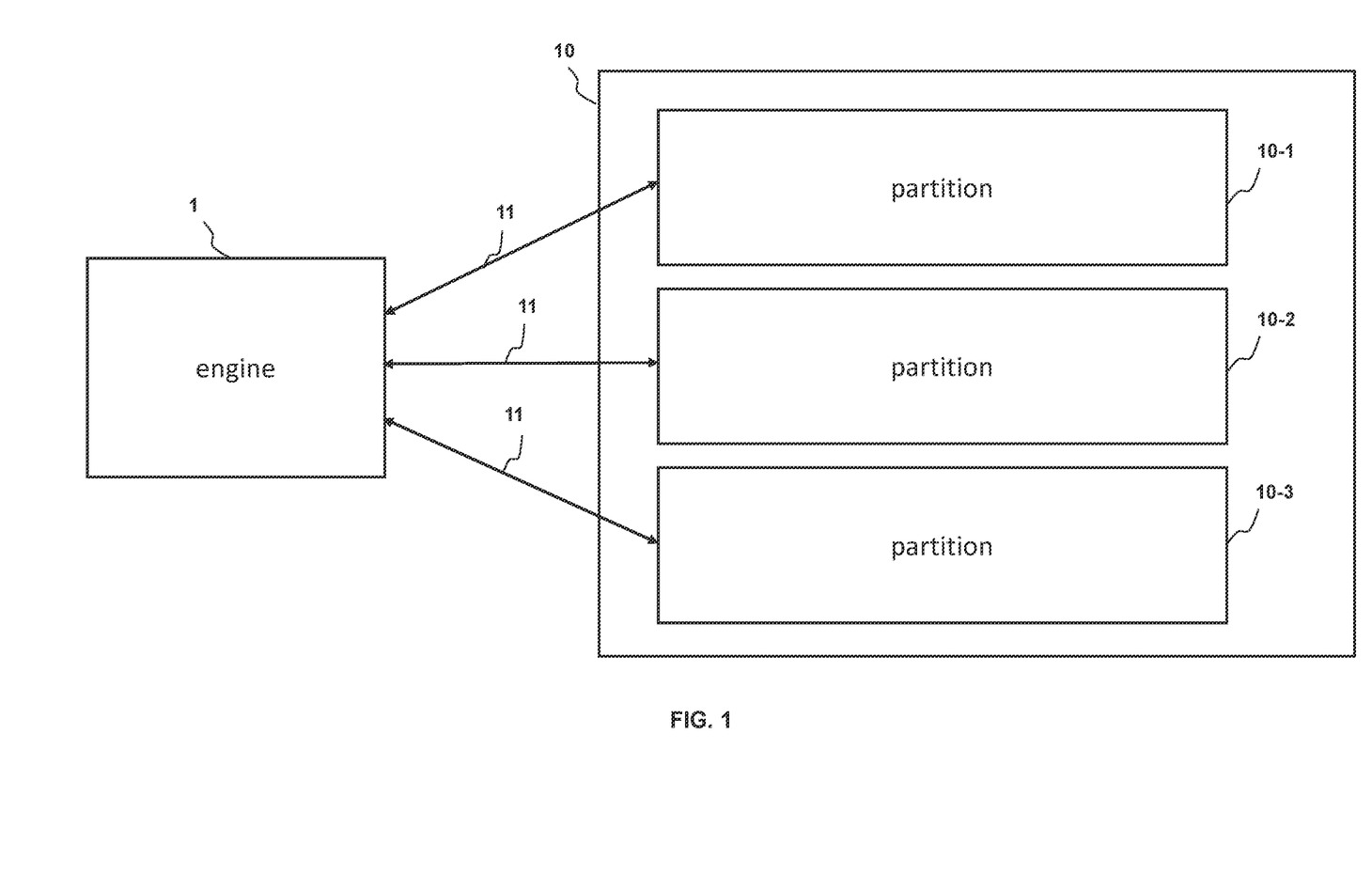
FIG. 1 illustrates a distributed computing environment as described herein.

FIG. 1 shows a distributed computing environment according to some embodiments. A computer-implemented engine 1 has access to a database system 10 with a number of database partitions 10-1, 10-2 and 10-3. The partitions 10-1, 10-2 and 10-3 shown in FIG. 1 are only of exemplary nature. The term database is utilized herein to cover any sorts, types and models of databases irrespective of any particular application or content of the data held, such as relational databases, noSQL, databases, distributed database systems, rules engines, knowledge bases, inference engines, data warehouses, cloud databases, and others.

Figure 3:
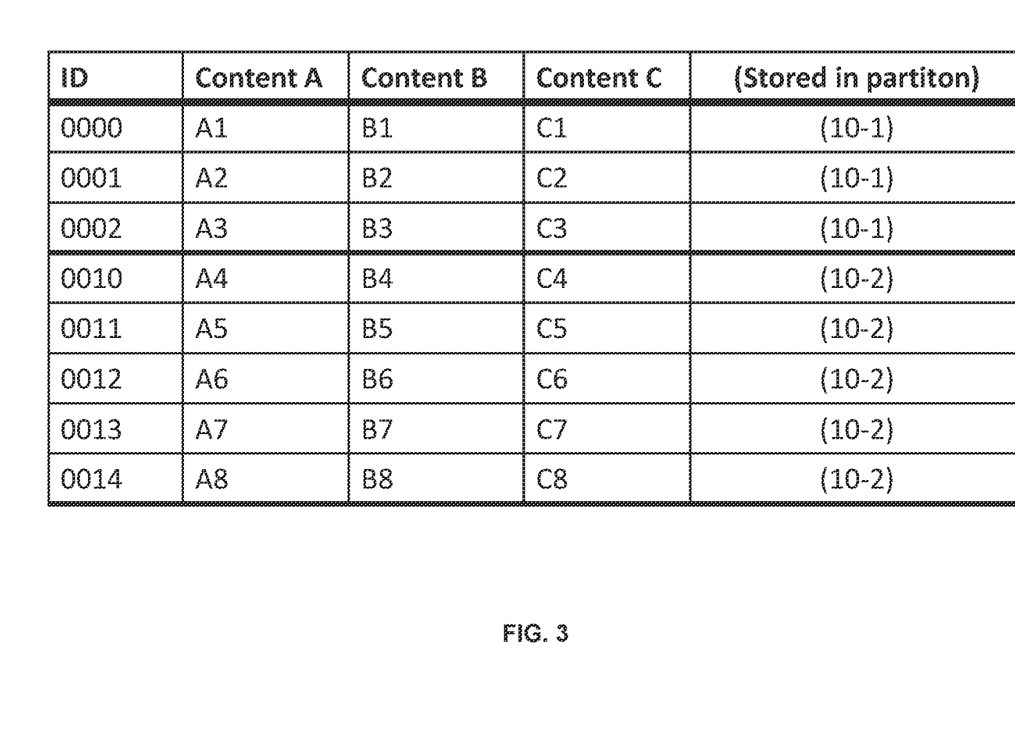
FIG. 3 is a table of data records as describes herein.

The data may be comprised of data records, which may be arranged in tables (such as in FIG. 3). In order to generate a disjunct distribution of the data records across the partitions, a table comprising the data records may be horizontally divided into several smaller tables. These smaller tables do not share any common data records and are therefore disjunct and will be distributed across the partitions, such as partition 10-1, 10-2 and 10-3. Therefore, when a request for data is received, not all of the partitions 10-1, 10-2 and 10-3 need to be searched, but only those partitions on which the data records relevant for the generation of the response are stored.

The database 10 may have any number of partitions. The computer-implemented engine 1 and the database 10 are located anywhere and are individual computing machines such as personal computers, mobile stations such as laptops or tablet computers, smartphones, and the like, as well as, in some embodiments, more powerful machines such as database application servers, distributed database systems respectively comprising multiple interconnected machines, data centers, etc. In some embodiments, the database 10 might be a similar machine as the computer-implemented engine 1, while, in other embodiments, the database 10 is more powerful than the computer-implemented engine 1. In some embodiments, the computer-implemented engine 1 and the database 10 are data centers which may be worldwide distributed.

Figure 11:
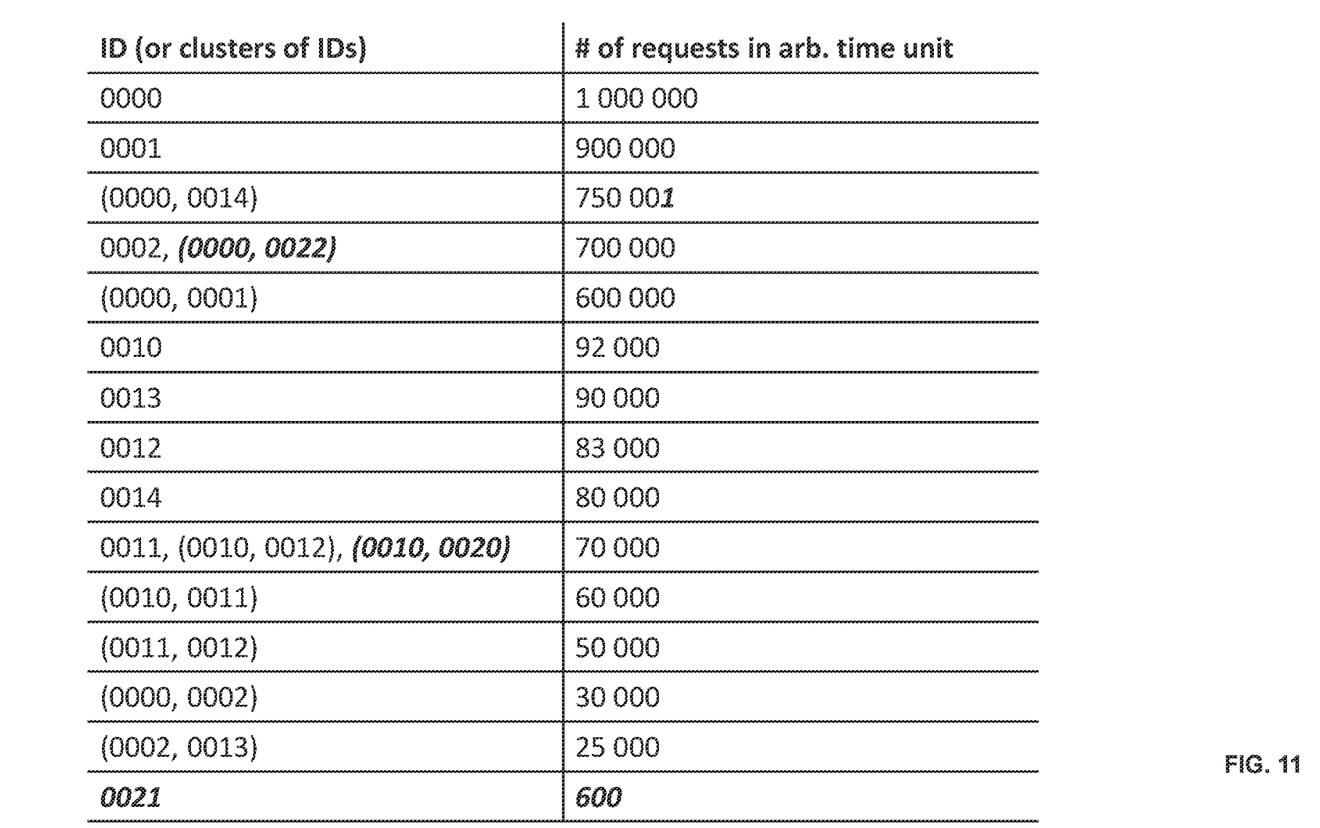
FIG. 11 illustrates the partition statistics with the added new data records.

Computer-implemented engine 1 and database 10 may be constituted of several hardware machines depending on performance requirements. Both, computer-implemented engine 1 and database 10, are embodied e.g. as stationary or mobile hardware machines comprising computing machines 40 as illustrated in FIG. 11 and/or as specialized systems such as embedded systems arranged for a particular technical purpose, and/or as software components running on a general or specialized computing hardware machine (such as a web server and web clients).

Computer-implemented engine 1 and database 10 are interconnected by the communication interfaces 11. Each of the interfaces 11 utilizes a wired or wireless Local Area Network (LAN) or a wireline or wireless Metropolitan Area Network (MAN) or a wire-line or wireless Wide Area Network (WAN) such as the Internet or a combination of the aforementioned network technologies and are implemented by any suitable communication and network protocols.

In some embodiments, the partitions 10-1, 10-2 and 10-2 are partitions within the same database system residing on one server. In other embodiments, however, the partitions 10-1, 10-2 and 10-3 are distributed over separate databases, e.g shards, residing on several servers.

The computer-implemented engine 1 is arranged to identify and retrieve a number of data records applicable to generate a response to a request. The engine 1 has access to at least two partitions, a first partition and a second partition, each of the partition maintaining a plurality of the data records. The first and the second partition may, as an example, correspond to the aforementioned partitions 10-1 and 10-2 of FIG. 1.

Figure 2:
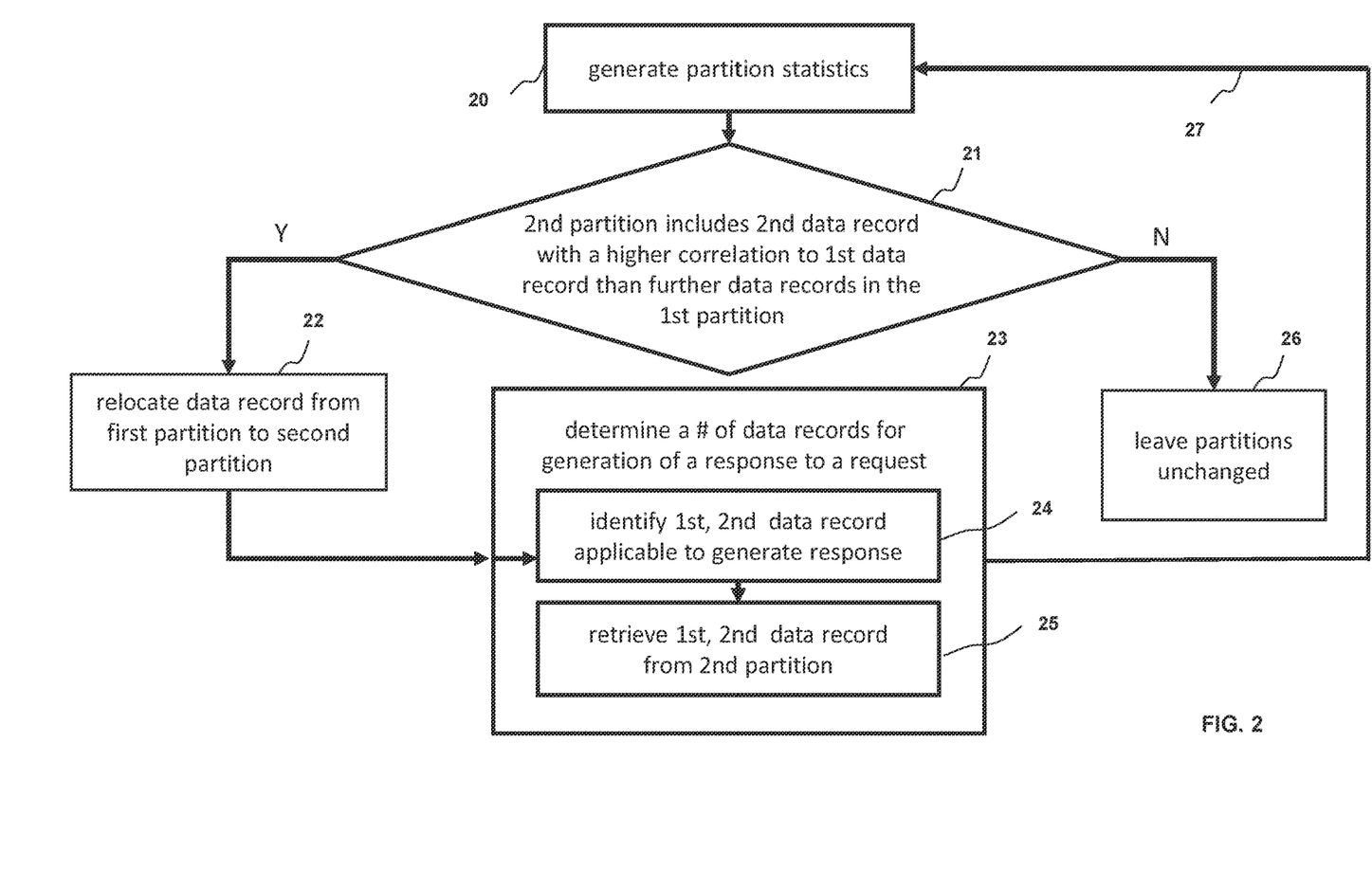
FIG. 2 shows a sequence chart for the generation of partition statistics and the relocation of the data records.

As shown in the flow diagram of FIG. 2, the engine 1 is arranged, in activity 20, to generate partition statistics during a number of identification and retrieval procedures, the partition statistics indicating correlations between the data records.

FIG. 3 is an exemplary illustration for data records according to some embodiments. The data records are listed in a table. The table comprises a column for an identification number of the data records. The table comprises further columns for content data, exemplarily labelled in FIG. 3 as "Content A", "Content B" and "Content C". The content data is symbolized as "A1, A2, . . . , A8, B1, B2, . . . , B8, C1, C2, . . . , C8".

Figure 4:
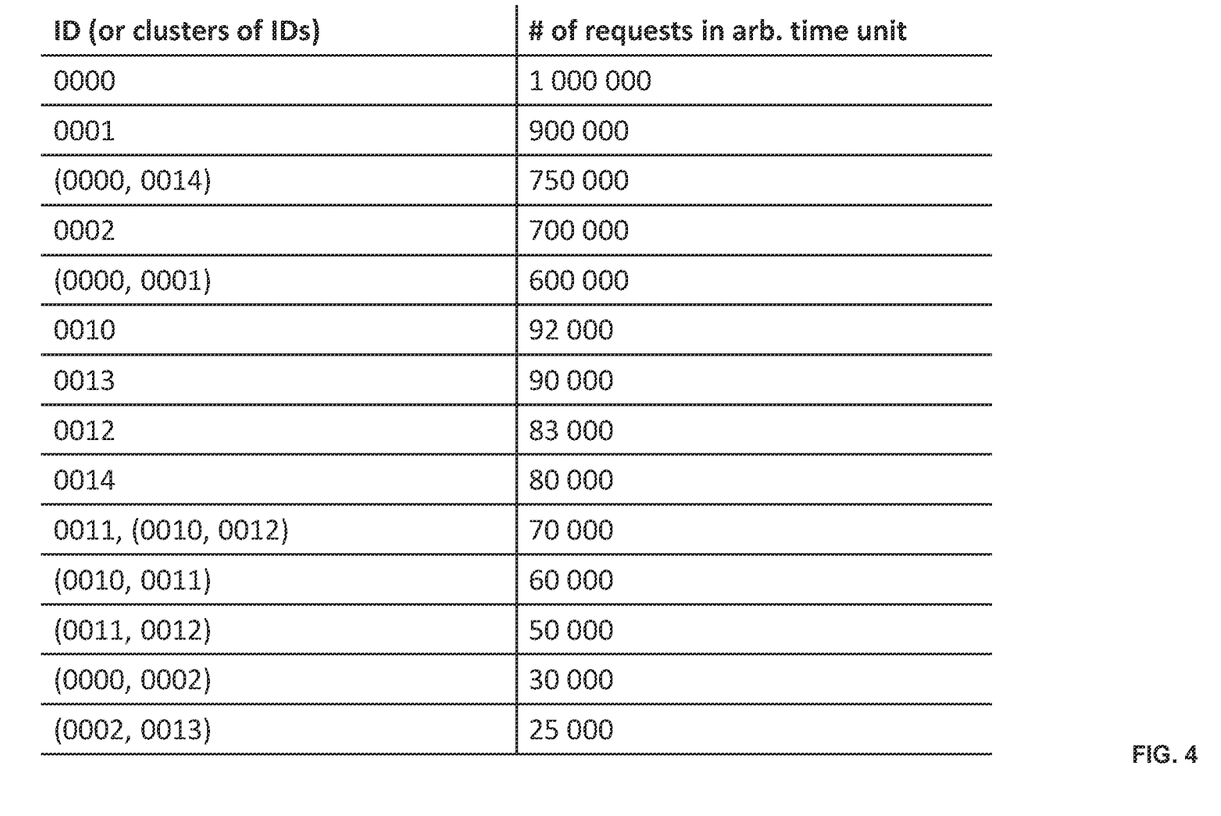
FIG. 4 illustrates generated partition statistics.

FIG. 4 illustrates, in an exemplarily manner, the partition statistics generated in activity 20 by computer-implemented engine 1. The correlations between the data records are described by numbers indicate how often a combination of data records has been requested in a certain period of time. FIG. 4 also shows, in the right column of the table, besides the requests for the individual data records in an arbitrary time unit, how many times a certain combination of data records (cluster) has been requested. These partition statistics are established and maintained by monitoring and logging actual requests received and processed by the database system 10 and the respective one or more data records returned. As an example, the cluster containing the data records with the IDs 0000 and 0014 has been requested 700 000 times per arbitrary time unit and the cluster containing the data records with the IDs 0000 and 0001 has been requested 600 000 times per arbitrary time unit. Furthermore, the statistics of FIG. 4 show that the clusters of data records (0010, 0011), (0010, 0012), (0011, 0012), (0000, 0002) and (0002, 0013) have been requested 60 000, 70 000, 50 000, 30 000 and 25 000 times respectively.

The partition statistics and the correlations between the data records as shown in FIG. 4 serve only as an illustrative example and are not intended to be limiting. In other embodiments, any type of statistics with any type of correlation between data records are established and maintained.

The computer-implemented engine 1 is further arranged to update, in activity 22 of FIG. 2, the partitions based on the partition statistics. The update includes relocating a first data record from the first partition to the second partition in response to determining (activity 21 of the flow diagram of FIG. 2) based on the partition statistics, that the second partition includes a second data record with a higher correlation to the first data record than further data records in the first partition.

Figure 5:
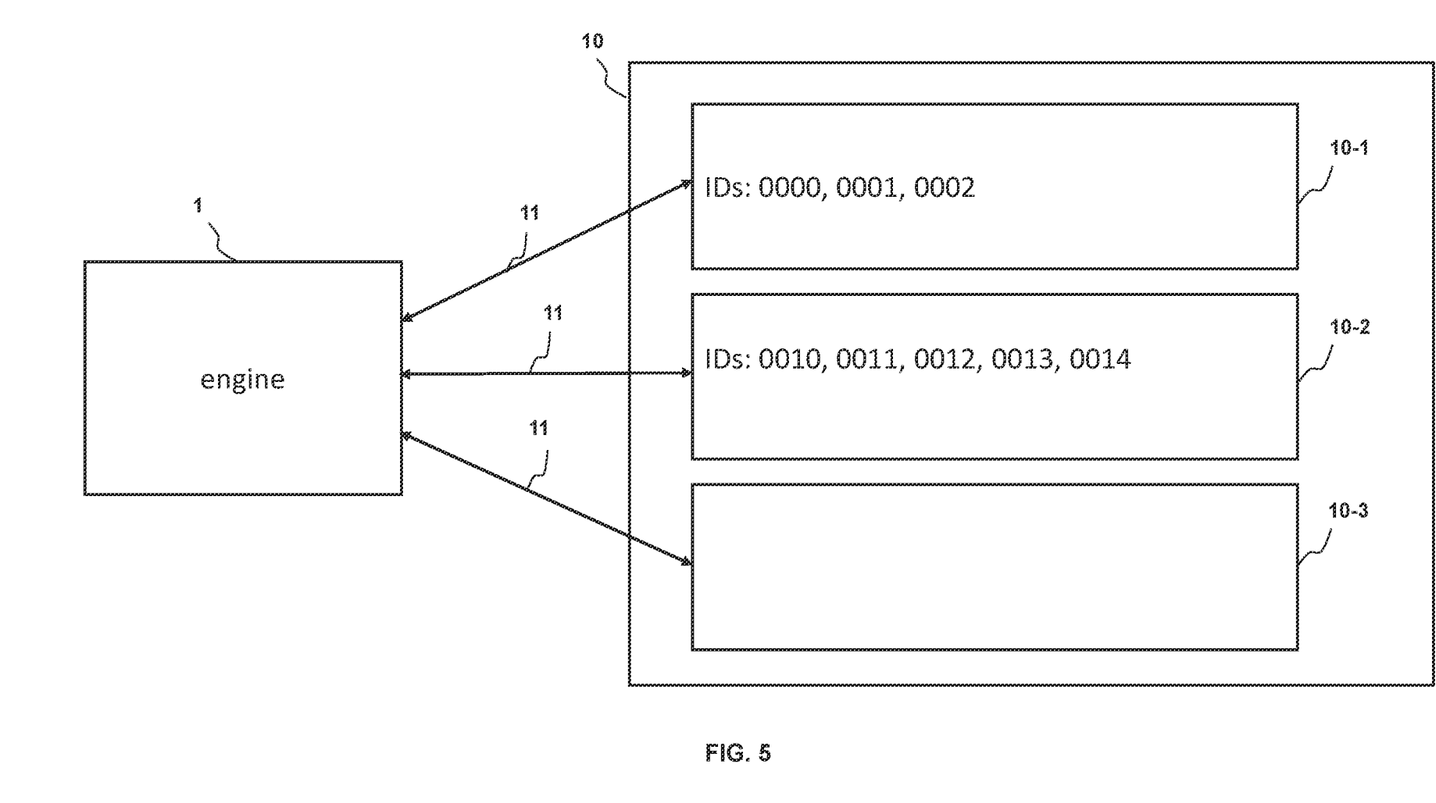
FIG. 5 shows the distributed computing environment as described herein with data records stored on the various partitions.
Figure 6:
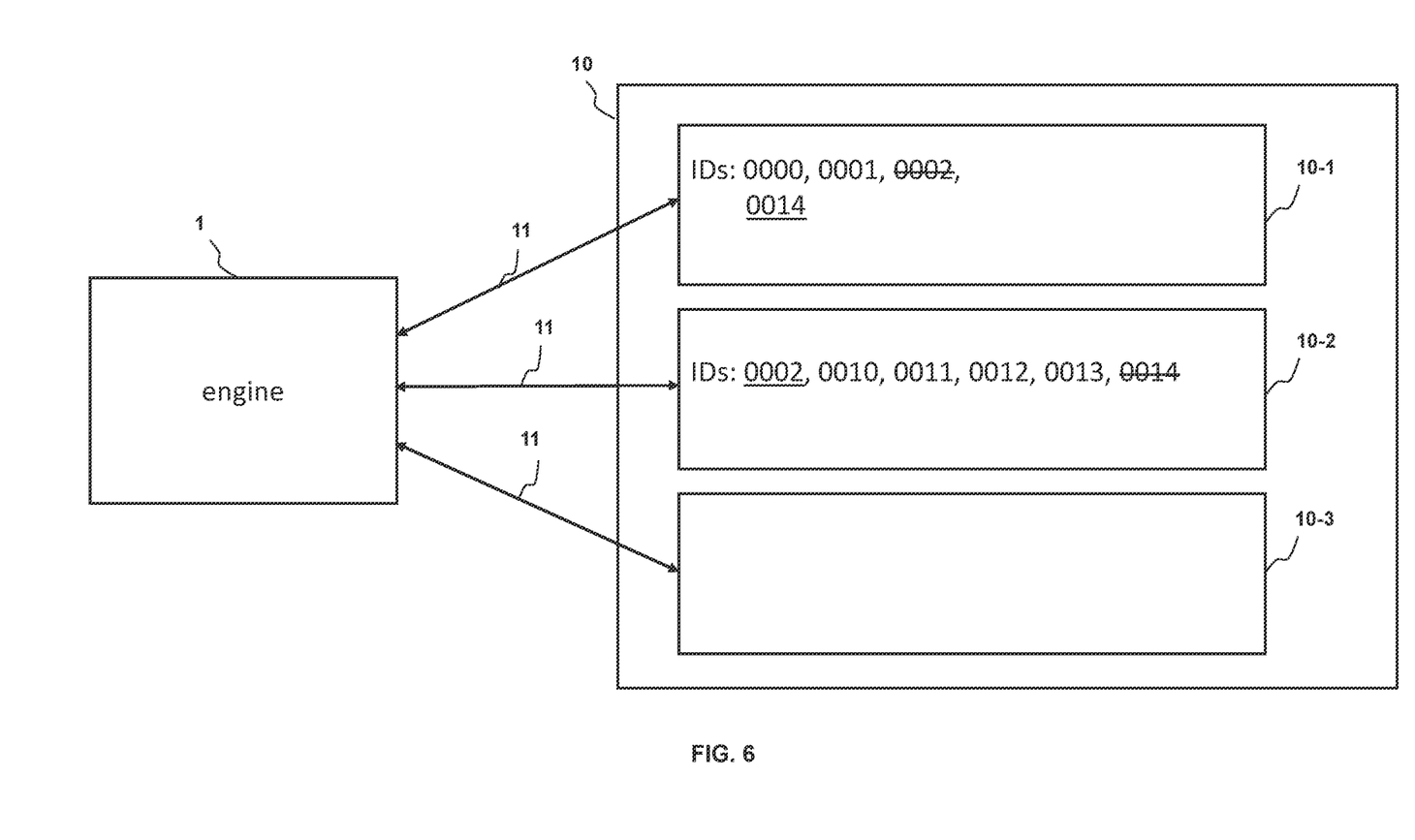
FIG. 6 depicts the distributed computing environment with the relocated data records.

FIGS. 5 and 6 show in an illustrative example the relocation of the data record having ID 0014 from partition 10-2 to partition 10-1. The relocation is performed based on the partition statistics, such as analyzing the partition statistics at regular intervals and determining if there are data records that have a significant correlation to each other (are regularly returned together in response to requests), but are currently located in different partitions. Data record 0014 alone is identified and retrieved in response to requests 80 000 times per arbitrary time unit (such as one day) and is originally stored in partition 10-2 together with the data records 0010, 0011, 0012 and 0013 which are identified and retrieved in response to requests in similar ranges (between 10 000 and 100 000 requests per arbitrary time unit), as shown in FIG.

5. The statistics of FIG. 4 further illustrate that data record 0014 is requested more often together—namely 750 000 times—with the data record 0000 which is stored in the partition 10-1. Therefore, data record 0014 has a higher correlation with the data records stored in partition 10-1 than with any data record of partition 10-2. A relocation of data record 0014 to partition 10-1 is performed as shown in FIG. 6. Furthermore, data record 0002 is requested alone 700 000 times, while in combination with the data record 0013, the number of requests are down to 25 000. Therefore, data record 0002 has a higher correlation with the data records stored in partition 10-2 than with any data record of partition 10-1. A relocation of data record 0002 to partition 10-2 is performed as shown in FIG. 6.

The previously illustrated examples refer to a correlation between two data records the number of requests for a cluster of two data records (data record #1, data record #2) per arbitrary time unit. Other correlations are envisaged and within the scope of the present disclosure, such as correlations between more than two data records. For example, a cluster of two data records, such as (0010, 0011) which is, according to FIG. 4 requested 60 000 per arbitrary time unit, may be a subcluster part of a bigger cluster, such as (0000, (0010, 0011)). This bigger cluster itself may be requested 45 000 times per arbitrary time unit. The subcluster (0010, 0011) may be stored as a separate data record on those partition, which store data records having the strongest correlations with the subcluster (0010, 0011). Another example for a cluster of data records is a correlation of three data records such as (data record #1, data record #2, data record #3). In some embodiments, correlations comprise clusters of four or more than four data records.

Computer-implemented engine 1 is further arranged to determine, in subsequent activity 23 of FIG. 2, a number of data records to generate a response to a new request based on the updated partitions. The request includes search parameters (e.g. key values) or search data enabling the computer-implemented engine 1 to calculate which data records fulfill the request and are to be part of the response. Generally, the computer-implemented engine includes all data records in the response that correspond to the search parameters in the request, i.e. the request is answered exhaustively. The determination includes the identification of the first data record and the second data record to be applicable to generate the response (activity 24) and the retrieving the first data record and the second data record from the second partition (activity 25). Further invoking the current example, engine 1 identifies data records 0000 and 0014 to exhaustively fulfill the search parameters and retrieves these data records from partition 10-1. Since data record 0014 has been previously relocated from partition 10-2 (first partition) to partition 10-1 (second partition), partition 10-1 is the sole partition which is searched in order to identify the requested data records 0000 and 0014. No other partitions need to be searched. The computational load on the database system 10 is therefore significantly reduced (compared to the previous situation depicted by FIG. 5).

In this way, the relocation of data records is performed in such a way, that in the case a computed response to a request has to include all possible data records applicable to generate the response, a minimum number of partitions is to be searched.

Compared to the prior art references U.S. Pat. Nos. 9,317,577 B2 and 8,972,403 B2, the method of the embodiment as shown of FIG. 2 performs the partitioning and relocation of the data records based on statistics established on past requests and returned responses and independent from the content of the data records. The partition statistics indicate e.g. by way of key values (e.g. the IDs of FIGS. 5 and 6) which data records have been returned individually and together (i.e. elements of the powerset of all data records) in the past, e.g. for an arbitrary period of time such as the last day. Furthermore, the statics employed by the method enable an identification of correlations between multiple data records, e.g. two data records, three data records, or more data records, which are regularly returned together in response to individual requests.

Figure 7:
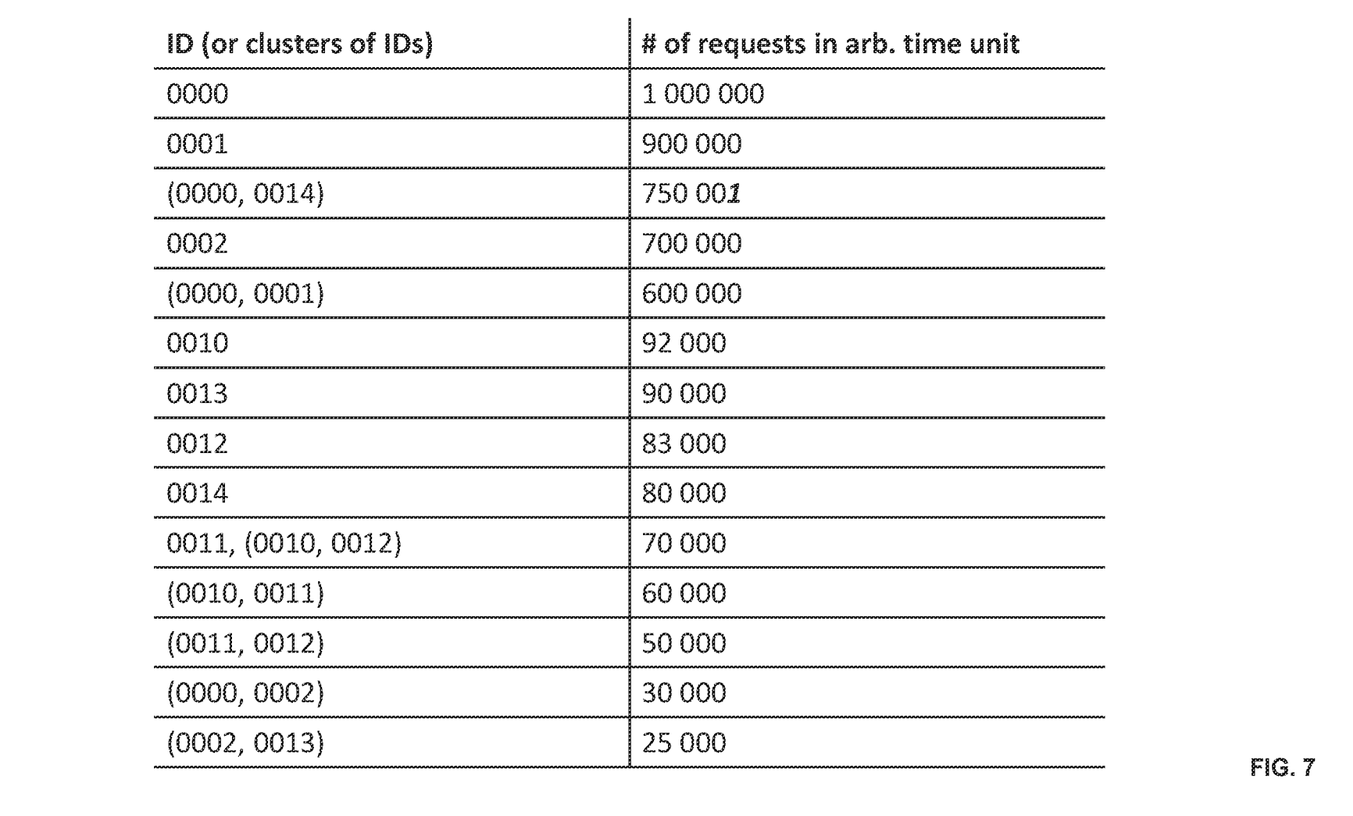
FIG. 7 illustrates updated partition statistics.

In some embodiments, the computer-implemented engine 1 is further arranged to add information about the retrieved first data record and second data record to the statistics based on the generated response to the request, thereby generating updated partition statistics. FIG. 7 shows an example of an updated version of the partition statistics of FIG. 4. The cluster of data records 0000 and 0014 has been retrieved once more by engine 1, as previously mentioned for the current example. As a consequence, the number of requests for the cluster of data records 0000 and 0014 is incremented by this additional request, thereby increasing the number in the right column of the table from 700 000 to 700 001, as shown in FIG. 7. The updated partition statistics may be regarded as newly generated partition statistics, generated in activity 20 of FIG. 2, which serve as a basis for a next update the partitions 10-1, 10-2 and 10-3.

In some embodiments, the implemented engine 1 is further arranged to periodically update the partitions based on the updated partition statistics. As mentioned above, the updated partition statistics may serve as a basis for an update of the partitions 10-1, 10-2 and 10-3. This update, as shown in arrow 27 of FIG. 2, is performed on a regular basis, such as e.g. hourly, depending on the specific use case. In a database system with a highly dynamical data structure, such as clusters of data records which get formed, rearranged and dissolved on a rapid time scale as well as data records, which get newly added, modified or deleted on a rapid time scale, the periodic update of the partitions ensure that for each new request, a minimum number of partitions has to be searched in order to identify the corresponding data records (activity 24). Therefore, computational load on the system is reduced even in a highly dynamical data environment. The period of the update of the partition statistics depends on the time scale the data records and their associations change. As a consequence, the update may be performed on the scale of any given time period such as seconds, minutes, hours and days.

In some embodiments, the correlations between the data records indicate subsets of at least two data records which have been identified and retrieved for respective requests during a given time period. Further referring to the present example, initially, there has been no correlation existed between the data records 0000 and 0014. Then, for e.g. the duration of one month, these two data records have been requested in combination. Therefore, a new correlation between the data records 0000 and 0014 is established by clustering these two data records in (0000, 0014).

In some embodiments, the partition statistics indicates how often individual data records and the subsets have been identified and retrieved for respective requests during the given time period. As an example, the aforementioned arbitrary time unit of FIGS. 4 and 7 in which the data records and the combination of data records are requested may be one hour, one week one month etc.

Figure 8:
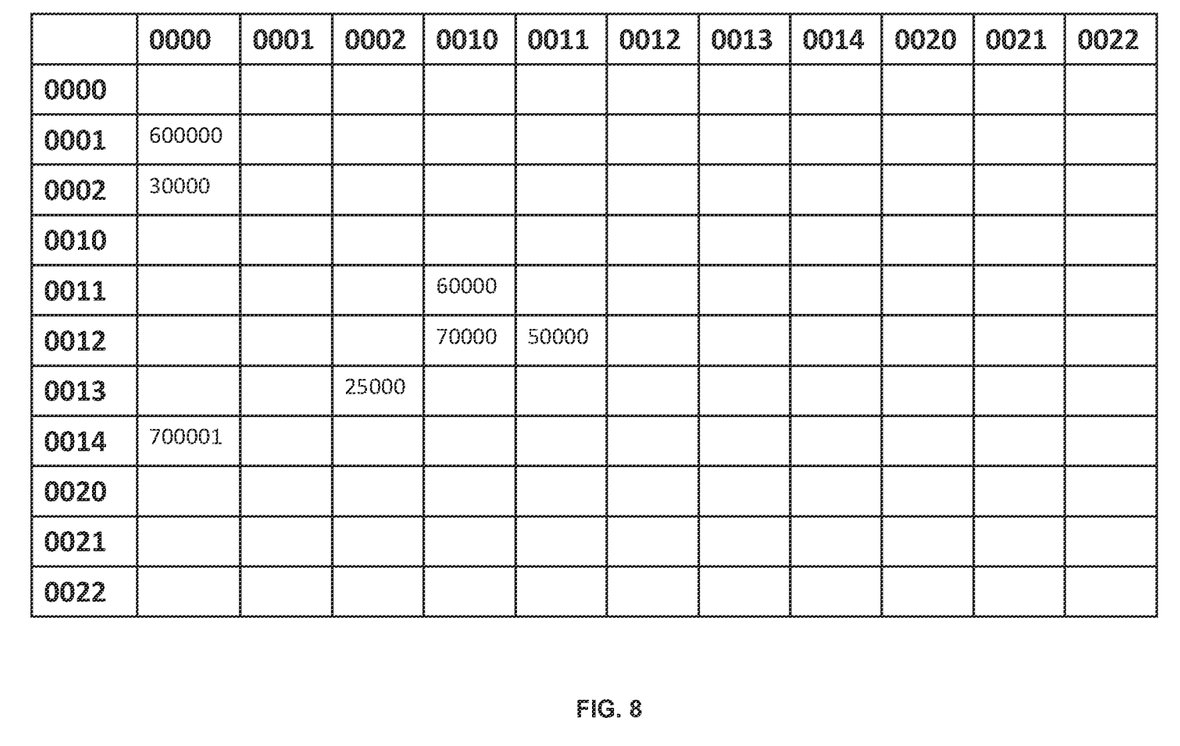
FIG. 8 shows a matrix representation of the partition statistics.

In some embodiments, the partition statistics comprise a matrix with cells indicating how many times the subsets of at least two data records have been identified and retrieved during the given time period and/or an ordered list indicating how many times the subsets of at least two data records have been identified and retrieved during the given time period. Example of ordered tables are shown in FIGS. 4 and 7, where the tables are ordered according to the number of requests per arbitrary time unit. FIG. 8 shows a corresponding matrix, whose fields or elements a[i][j] indicate how many times a correlation of data records, has been requested over a time period, such as a day. For example, the field of the second column and the third row (element a[data record #3][data record #2]) of the matrix of FIG. 8 indicate that the cluster (0000, 0001) has been requested 600 000 times per arbitrary time unit. The fields of the matrix are updated, once the partition statistics is updated. Referring to the aforementioned example of updating number of requests for the cluster (0000, 0014) from 700 000 to 700 001, the matrix field of the second column and the ninth row is updated from 700 000 to 700 001.

The matrix of FIG. 8 may represent a co-occurrence matrix where each element of a matrix a[data record #i][data record #j] represents the number of co-occurrences between data record #i and data record #j. The matrix of FIG. 8 may be interpreted as a linked graph. Each node of the linked graph represents a data record, with the co-occurrence factor representing the distance between the data records. There are methods known in the art how to determine an optimal number of partitions as well as the resulting number of data records per partition, such as the k-means-algorithm in combination with the elbow method. The correlation of the data records within a partition may be measured by e.g. in the following ways:

Determination of the inertia, with the inertia indicating how far away the data records within a partition are. Therefore, a small of inertia is aimed for.

Determining the silhouette score, with the silhouette score indicating a cross-partition correlation, i.e. a correlation of the data records in one partition with the data records in another partition. The range of silhouette score is from −1 to 1. The silhouette score should be closer to 1 than −1.

Once the number of partitions is known, the data records may be distributed across the partitions. In some embodiments, the co-occurrences of the matrix in FIG. 8 may represent similarities between the data records. Locating the data records in partitions may be performed by methods known in the art, such as the method of Spectral Clustering. Spectral Clustering is a technique which is used to identify communities of nodes (such as the present data records) in a graph based on the edges connecting the nodes. The aforementioned mechanisms may be utilized to setup the number of partitions and distribute the data records across the partitions initially, and also for adapting the partitions including relocating data records from one partition to another as described above.

In some embodiments, the computer-implemented engine 1 is additionally arranged to update the partitions by being arranged to relocate a number of the data records between the partitions to balance computational load on the partitions. Further referring the present example, an analysis of the table of FIG. 4 yields that the load distribution between the partitions 10-1, 10-2 and 10-3 of FIG. 1 is that partition 10-1 carries about 75% of the total computational system load, while partitions 10-2 and 10-3 carry about 25% and 0% of the total computational system load, respectively. In order to balance the computational load between partitions 10-1, 10-2 and 10-3 more evenly, some data records originally stored on partition 10-1 may be relocated to partitions 10-2 and 10-3.

The aforementioned relocation of data records 0002 and 0014 have already resulted in a more even load distribution. Partition 10-1 now shoulders 61% of the total computational load and partition 10-2 now 39%.

An analysis of the table of FIG. 4 for example may prompt the engine 1 to further relocate data record 0000, which is requested 1 000 000 times per arbitrary time unit to partition 10-3. As a consequence, about 1.7 million requests are shifted from partition 10-1 to partition 10-3, resulting in a more even distributed computational load between the partitions, namely 28% of the total load for partition 10-1, 39% for partition 10-2 and 33% for partition 10-3.

In some embodiments, the computer-implemented engine 1 is arranged to store a new data record at a third partition by default and to update the partition statistics in response to collectively identifying and retrieving the new data record from the third partition and the second data record from the second partition to generate a number of further responses to a respective number of further requests. The computer-implemented engine 1 is arranged to further update the partitions based on the updated partition statistics, including relocating the new data record from the third partition to the second partition in response to determining, based on the updated partition statistics, that the new data record has a higher correlation to the second data record than to further data records in the first partition.

Figure 9:
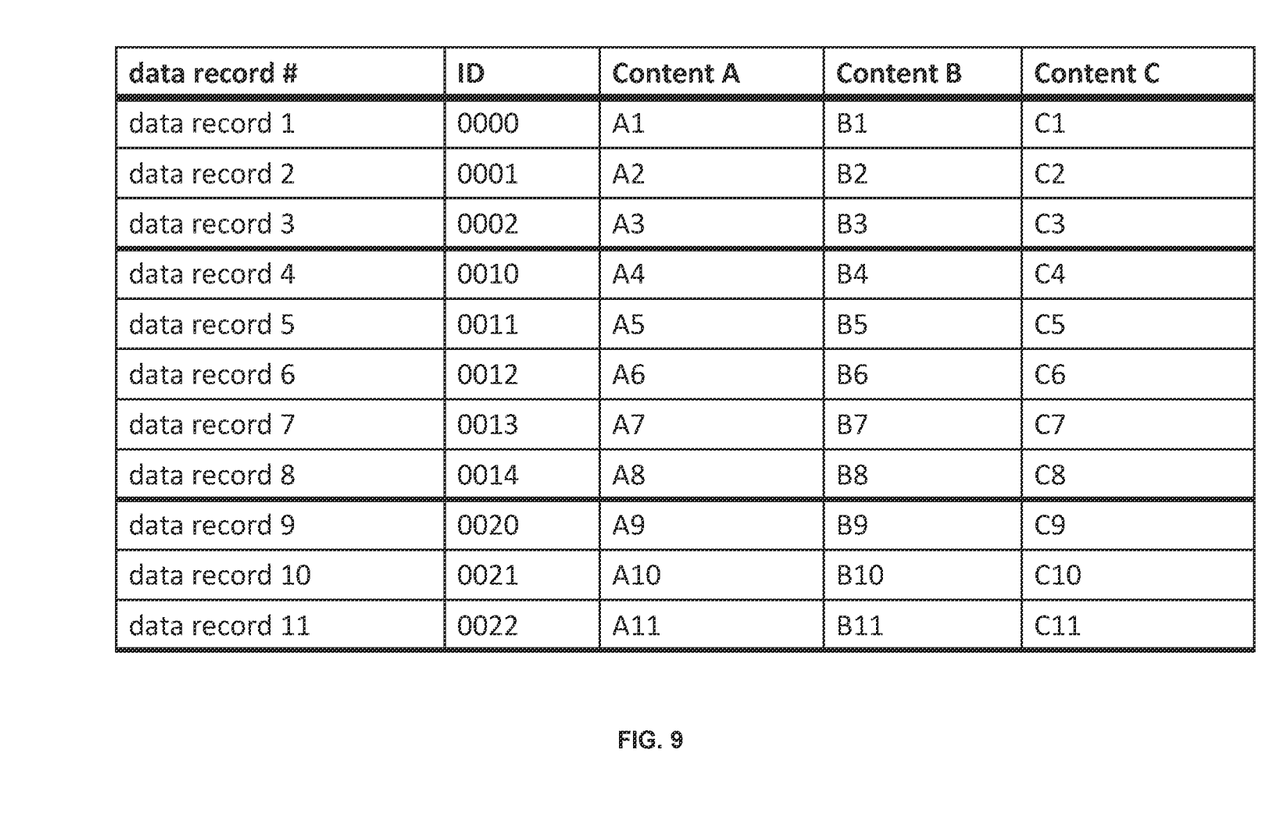
FIG. 9 is a table of data records with added new data records.
Figure 10:
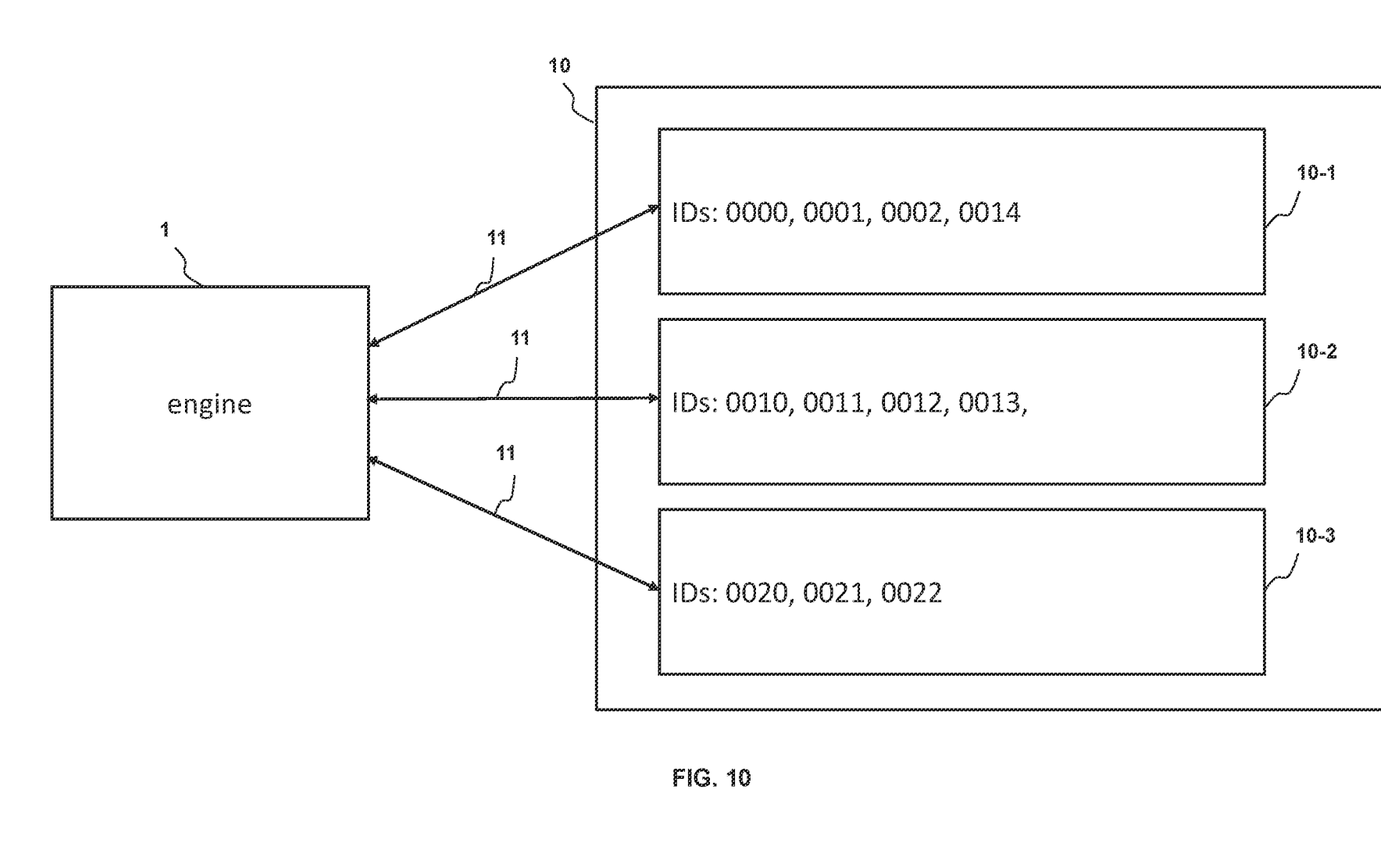
FIG. 10 shows the distributed computing environment with the added new data records.
Figure 12:
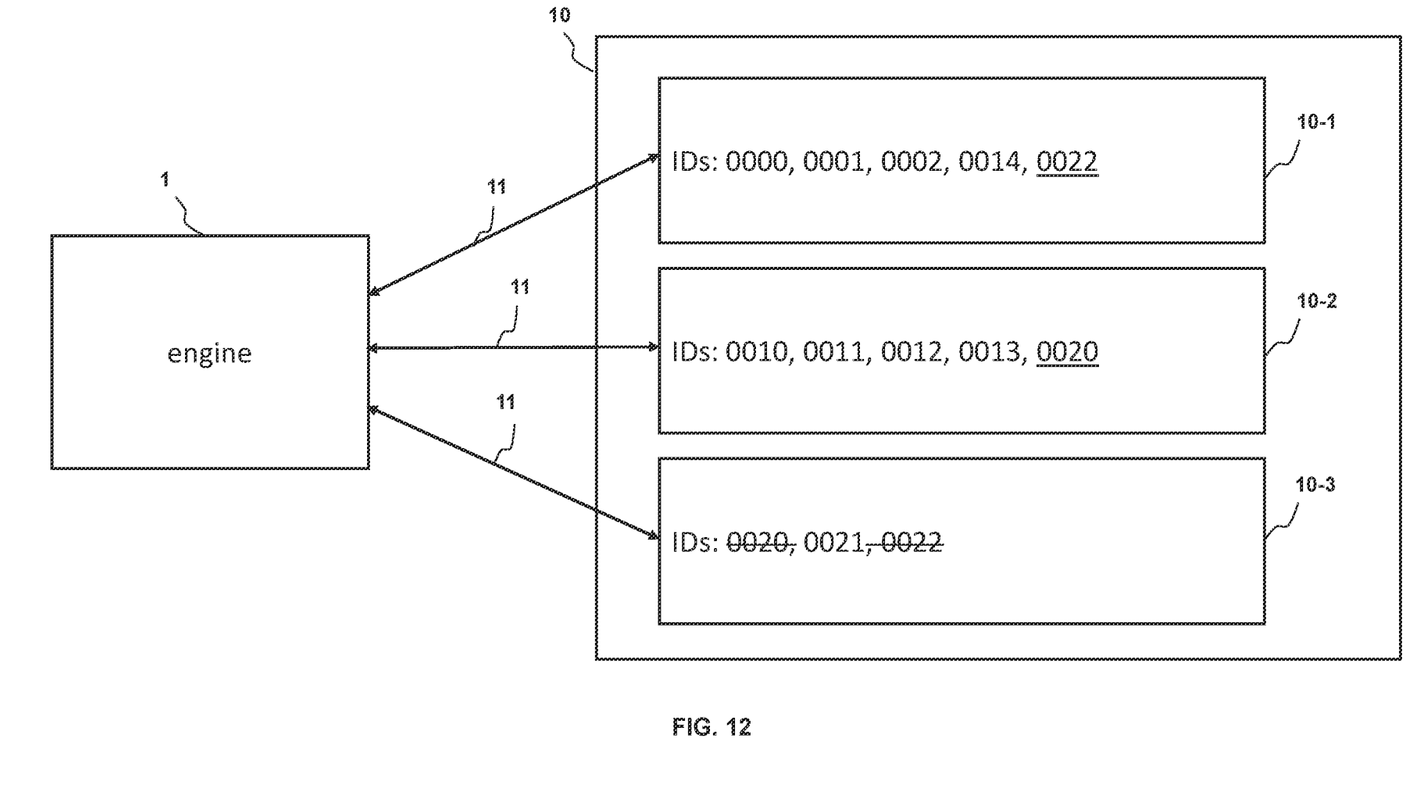
FIG. 12 depicts the distributed computing environment with the added new data records.
Figure 13:
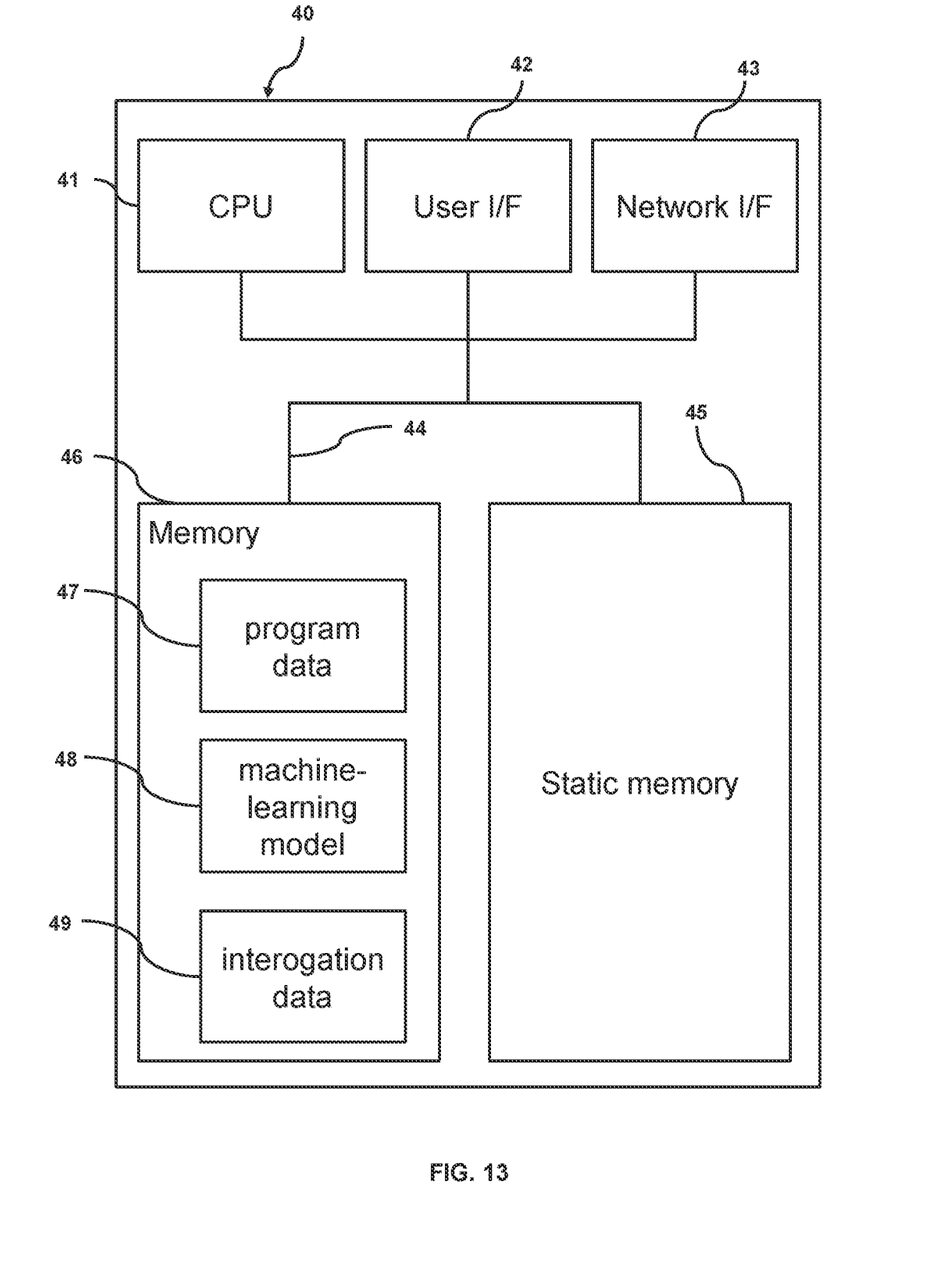
FIG. 13 depicts an internal structure of a computation engine which to host a computer-implemented engine or a database.

FIG. 9 shows the addition of three new data records 0020, 0021 and 0022 to the existing data records, which are already located in the partitions 10-1 and 10-2. The new data records 0020, 0021 and 0022 are by default stored in partition 10-3, as shown in FIG. 10. In subsequent requests, these new data records 0020 and 0020 get requested in combination with data records 0010 and 0000, respectively. Data record 0021 get requested with no combination. FIG. 11 shows the corresponding updated partition statistics. Combination (0000, 0022) get requested 700 000 times per arbitrary time unit and combination (0010, 0020) get requested 70 000 times par arbitrary time unit. Data record 0021 get requested 600 times per arbitrary time unit. Based on this updated partition statistics, the partitions 10-1, 10-2 and 10-3 get updated, as shown in FIG. 12. Data record 0020 is relocated to partition 10-2, since it has the strongest correlation with the data records stored on that partition. Furthermore, data record 0022 is relocated to partition 10-1 due to its strongest correlation with the data records of that corresponding partition. As a consequence, the new data records 0020, 0021 and 0022 have been relocated in such a way, that only a minimum of partitions have to be searched in the case of new requests.

FIG. 11 is a diagrammatic representation of the internal components of a computing machine 40 implementing the functionality of computer-implemented engine 1 and/or database 10. The computing machine 40 includes a set of instructions to cause the computing machine 40 to perform any of the methodologies discussed herein when executed by the computing machine 40. The computing machine 40 includes at least one processor 41, a main memory 46 and a network interface device 43 which communicate with each other via a bus 44. Optionally, the computing machine 40 may further include a static memory 45 and a diskdrive unit. A display, an alpha-numeric input device and a cursor control device may be provided as examples of user interface 42. The network interface device 43 connects the computing machine 40 implementing the computer-implemented engine 1 with the database 10. Furthermore, network interface device 43 also connects the computing machine 40 implementing the database 10 with the computer-implemented engine 1.

Computing machine 40 includes a memory 46 such as main memory, random access memory (RAM) and/or any further volatile memory. The memory 46 may store temporary data and program data 47 to facilitate the functionality of the computer-implemented engine 1 and/or the database 10, including program data to realize the generation and update of the partition statistics and the storage, the location and re-location of the data records. The memory 46 may also store temporary data such as request and response data 49.

A set of computer-executable instructions embodying any one, or all, of the methodologies described herein, resides completely, or at least partially, in or on a machine-readable storage medium, e.g., in the static memory 45 or, when loaded and being executed, in the main memory 46. For example, the instructions may include software processes implementing the database request processing functionality of the computer-implemented engine 1 and/or the database 10. The instructions may further be transmitted or received as a propagated signal via the Internet through the network interface device 43 or via the user interface 42. Communication within computing machine 40 is performed via a bus 44. Basic operation of the computing machine 40 is controlled by an operating system which is also located in the memory 46, the at least one processor 41 and/or the static memory 45.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently. Moreover, any of the flowcharts, sequence diagrams, and/or block diagrams may include more or fewer blocks than those illustrated consistent with embodiments and examples.

The terminology used herein is for the purpose of describing particular embodiments and examples, and is not intended to be limiting. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details.

The invention claimed is:

1. A computing machine for identifying and retrieving a number of data records applicable to generate a response to a request, the computing machine comprising:
   a processor having access to at least a first partition and a second partition, each of the first and second partitions maintaining a plurality of the data records, the processor configured to:
      generate partition statistics during a plurality of identification and retrieval procedures including at least one procedure to retrieve a cluster containing a first data record of the first partition and a second data record of the second partition, and at least one procedure to retrieve a cluster containing the first record and a third record of the first partition, the partition statistics indicating (i) a first number of the procedures to retrieve the cluster containing the first data record of the first partition and the second data record of the second partition, and (ii) a second number of the procedures to retrieve the cluster containing the first data record and the third data record of the first partition,
      update the partitions based on a comparison of the partition statistics,
      including relocating the first data record from the first partition to the second partition, without relocating the third data record, in response to determining, based on the partition statistics, that the first number is higher than the second number,
      determine a number of data records to generate the response to the request based on the updated partitions, including (i) identifying the first data record and the second data record to be applicable to generate the response, and (ii) retrieving the first data record and the second data record from the second partition.

2. The computing machine according to claim 1, further being arranged to add information about the retrieved first data record and second data record to the statistics based on the generated response to the request, thereby generating an updated partition statistics.

3. The computing machine according to claim 2, further being arranged to periodically update the partitions based on the updated partition statistics.

4. The computing machine according to claim 1, wherein the partition statistics comprise
   a matrix with cells indicating the first number and the second number and/or
   an ordered list indicating the first number and the second number.

5. The computing machine according to claim 1, further being arranged to update the partitions by being arranged to relocate a number of the data records between the partitions to balance computational load on the partitions.

6. The computing machine according to claim 1, further being arranged to:
   store a new data record at a third partition by default, update the partition statistics in response to collectively identifying and retrieving the new data record from the third partition and the second data record from the second partition to generate a number of further responses to a respective number of further requests, update the partitions based on the updated partition statistics, including relocating the new data record from the third partition to the second partition in response to determining, based on the updated partition statistics, that the new data record has a higher correlation to the second data record than to further data records in the first partition.

7. A method for identifying and retrieving a number of data records applicable to generate a response to a request at a computer implemented engine, the engine having access to at least two partitions, a first partition and a second partition, each of the partitions maintaining a plurality of the data records, wherein the method comprises, at the engine:

generating partition statistics during a plurality of identification and retrieval procedures including at least one procedure to retrieve a cluster containing a first data record of the first partition and a second data record of the second partition, and at least one procedure to retrieve a cluster containing the first record and a third record of the first partition, the partition statistics indicating (i) a first number of the procedures to retrieve the cluster containing the first data record of the first partition and the second data record of the second partition, and (ii) a second number of the procedures to retrieve the cluster containing the first data record and the third data record of the first partition, updating the partitions based on a comparison of the partition statistics, including relocating the first data record from the first partition to the second partition, without relocating the third data record, in response to determining, based on the partition statistics, that the first number is higher than second number, determining a number of data records to generate the response to the request based on the updated partitions, including (i) identifying the first data record and the second data record to be applicable to generate the response, and (ii) retrieving the first data record and the second data record from the second partition.

8. The method according to claim 7 further comprising, at the engine: adding information about the retrieved first data record and second data record to the statistics based on the generated response to the request, thereby generating an updated partition statistics.

9. The method according to claim 8 further comprising, at the engine: periodically updating the partitions based on the updated partition statistics.

10. The method according to claim 7, wherein the partition statistics comprise a matrix with cells indicating the first number and the second number and/or an ordered list indicating the first number and the second number.

11. The method according to claim 7, further comprising: updating the partitions by relocating a number of the data records between the partitions to balance computational load on the partitions.

12. The method according to claim 7, further comprising, at the engine:

storing a new data record at a third partition by default, updating the partition statistics in response to collectively identifying and retrieving the new data record from the third partition and the second data record from the second partition to generate a number of further responses to a respective number of further requests, updating the partitions based on the updated partition statistics, including relocating the new data record from the third partition to the second partition in response to determining, based on the updated partition statistics, that the new data record has a higher correlation to the second data record than to further data records in the first partition.

13. A non-transitory computer-readable storage medium storing program instructions executable by a processor to identify and retrieve a number of data records applicable to generate a response to a request by:

accessing at least a first partition and a second partition, each of the first and second partitions maintaining a plurality of the data records;

generating partition statistics during a plurality of identification and retrieval procedures including at least one procedure to retrieve a cluster containing a first data record of the first partition and a second data record of the second partition, and at least one procedure to retrieve a cluster containing the first record and a third record of the first partition, the partition statistics indicating (i) a first number of the procedures to retrieve the cluster containing the first data record of the first partition and the second data record of the second partition, and (ii) a second number of the procedures to retrieve the cluster containing the first data record and the third data record of the first partition, updating the partitions based on a comparison of the partition statistics, including relocating the first data record from the first partition to the second partition, without relocating the third data record, in response to determining, based on the partition statistics, that the first number is higher than second number, determining a number of data records to generate the response to the request based on the updated partitions, including (i) identifying the first data record and the second data record to be applicable to generate the response, and (ii) retrieving the first data record and the second data record from the second partition.

\* \* \* \* \*